US012753313B2

(12) United States Patent
Mao

(10) Patent No.: US 12,753,313 B2
(45) Date of Patent: Oct. 6, 2026

(54) CELLULOSE-BASED ENVIRONMENTALLY FRIENDLY PLASTIC SUBSTITUTE MATERIAL AND PREPARATION METHOD THEREOF

(71) Applicant: Ningbo Jinyi Electronic Technology Co., Ltd., Ningbo (CN)

(72) Inventor: Yin Mao, Ningbo (CN)

( * ) Notice: Subject to any disclaimer, the term of this patent is extended or adjusted under 35 U.S.C. 154(b) by 66 days.

(21) Appl. No.: 19/019,944

(22) Filed: Jan. 14, 2025

(65) Prior Publication Data

US 2026/0184925 A1 Jul. 2, 2026

(30) Foreign Application Priority Data

Dec. 30, 2024 (CN) ........................ 202411960530.0

(51) Int. Cl.

*C08L 97/02* (2006.01)
*C08K 3/14* (2006.01)
*C08K 3/30* (2006.01)
*C08L 1/02* (2006.01)
*C08L 29/04* (2006.01)

(52) U.S. Cl.

CPC ................ *C08L 97/02* (2013.01); *C08K 3/14* (2013.01); *C08K 3/30* (2013.01); *C08L 1/02* (2013.01); *C08L 29/04* (2013.01); *C08K 2003/3009* (2013.01); *C08K 2201/011* (2013.01)

(58) Field of Classification Search

CPC .......... C08L 97/02; C08L 97/005; C08L 1/02; C08K 2003/3009

See application file for complete search history.

(56) References Cited

U.S. PATENT DOCUMENTS

2019/0127883 A1 5/2019 Lu et al.

FOREIGN PATENT DOCUMENTS

| | | | | | |
|---|---|---|---|---|---|
| CN | 109865526 A | * | 6/2019 | | |
| CN | 112375369 A | | 2/2021 | | |
| CN | 112646236 A | | 4/2021 | | |
| CN | 112899313 A | * | 6/2021 | .............. | C12P 19/02 |
| CN | 114381043 A | * | 4/2022 | ................ | C08L 3/02 |
| CN | 115785528 A | | 3/2023 | | |
| CN | 116376267 A | | 7/2023 | | |
| CN | 116459852 A | * | 7/2023 | ............. | C02F 1/461 |
| CN | 116535711 A | | 8/2023 | | |
| CN | 118580549 A | | 9/2024 | | |
| JP | 2005139422 A | | 6/2005 | | |

OTHER PUBLICATIONS

Machine translation of CN-109865526-A (2019, 8 pages).*
Machine translation of CN-114381043-A (2022, 9 pages).*
Machine translation of CN-116459852-A (2023, 7 pages).*
Machine translation of CN-112899313-A (2021, 9 pages).*
Wei Zheng; Zhengming Sun; Peigen Zhang; Wubian Tian; Ying Wang; Yamei Zhang; Research Progress on Two-Dimensional Nanomaterial MXene; Materials Review, Issue 09; May 10, 2017; pp. 6-19.
Arulkirubakaran, D et al., Effect of micro-textured tools on machining of Ti—6Al—4V alloy: An experimental and numerical approach; "International Journal of Refractory Metals & Hard Materials", vol. 54, Jan. 1, 2016; pp. 165-177.
Rong Du, Preparation of Titanium Carbide Modified Iron Oxide and Molybdenum Sulfide Composite Materials and Their Lithium Storage Performance; "Wanfang Database"; Dec. 8, 2020; pp. 1-76.

* cited by examiner

*Primary Examiner* — Brieann R Johnston

(57) ABSTRACT

A cellulose-based environmentally friendly plastic substitute material and a preparation method thereof, consisting of nanofiller of molybdenum disulfide nanosheet composite transition metal carbide, lignin-containing nanocellulose suspension, citric acid, glycerol and polyvinyl alcohol; the nanofiller of molybdenum disulfide nanosheet composite transition metal carbide consists of molybdenum disulfide nanosheets and transition metal carbide; by dispersing the nanofiller of molybdenum disulfide nanosheet composite transition metal carbide in the lignin-containing nanocellulose suspension, and under the crosslinking action of the citric acid, a dense composite material is formed; this material fully fills the voids in the lignin-containing nanocellulose structure, forming a stable and dense network structure that significantly enhances the toughness, hydrophobicity, and heat resistance of the composite material, thus reducing problems such as fracture and deformation caused by moisture or heat exposure.

6 Claims, 3 Drawing Sheets

CELLULOSE-BASED ENVIRONMENTALLY FRIENDLY PLASTIC SUBSTITUTE MATERIAL AND PREPARATION METHOD THEREOF

1. TECHNICAL FIELD

The invention relates to the technical field of polymer materials, in particular to a cellulose-based environmentally friendly plastic substitute material and a preparation method thereof.

2. BACKGROUND ART

Plastic, due to its low cost, ease of use, chemical resistance, good processability, high transparency, high strength, and so on, has been widely used in the packaging industry. However, a large amount of plastic waste leaks into the soil, water, and other natural environments, making it difficult to degrade and causing visual pollution, soil degradation, microplastic contamination, and other environmental hazards. In the process of plastic recycling, due to problems such as poor management systems, high costs, and low recycling rates, only a small amount of plastic waste is eventually recycled. The rest of the unrecycled plastic waste ends up accumulating in landfills or entering the natural environment. Therefore, non-degradable petroleum-based plastics, while bringing convenience to human society, also pose a serious threat to global organisms and the environment.

Developing green and biodegradable packaging materials by using renewable resources is of great significance in addressing the environmental problems caused by petroleum-based plastics. Cellulose, as the most abundant natural renewable polymer material on Earth, has emerged as a crucial raw material for sustainable development due to its low cost, sustainability, good biocompatibility, and excellent biodegradability. It is regarded as the primary driving force for the future energy and chemical industries.

The existing technologies currently have the following main problems:

due to its molecular structure and strong hydrogen bond network, cellulose is easily affected by moisture, which reduces the quality of the material, and is also easily affected by high temperatures and deformed. Due to its poor heat resistance and hydrophobicity, the service life of cellulose-based materials is limited.

3. SUMMARY OF THE INVENTION

In view of the above situation, in order to overcome the defects of the prior art, the invention provides a cellulose-based environmentally friendly plastic substitute material, comprising the following components in parts by weight: 20-30 parts of nanofiller of molybdenum disulfide nanosheet composite transition metal carbide, 40-50 parts of lignin-containing nanocellulose suspension, 2-4 parts of citric acid, 3-5 parts of glycerol, and 10-15 parts of polyvinyl alcohol.

The nanofiller of molybdenum disulfide nanosheet composite transition metal carbide comprises the following components in parts by weight: 30-40 parts of molybdenum disulfide nanosheets and 10-20 parts of transition metal carbide.

The lignin-containing nanocellulose suspension is prepared by pretreating wheat straw with a deep eutectic solvent of benzyltrimethylammonium chloride and oxalic acid dihydrate, and followed by high-pressure homogenization mechanical treatment.

A preparation method of the nanofiller of molybdenum disulfide nanosheet composite transition metal carbide specifically comprises the following steps:

(1) dispersing 30-40 mg of molybdenum disulfide and 100 μL of polyacrylic acid liquid in 25 mL of ultrapure water, ultrasonically treating for 5-6 h, and then centrifuging at 3000-4000 rpm for 10 min, taking the supernatant and centrifuging it at a speed of 7000-8000 rpm for 10 min, collecting the product, separating thinner molybdenum disulfide nanosheets from bulk molybdenum dioxide by using a chemical stripping method, which can serve as a plasticizer for filler modification, improving the brittle fracture of cellulose materials and endowing them with excellent mechanical properties; additionally, the sulfur atoms in the surface structure of molybdenum dioxide exhibit a certain degree of protrusion, which achieves hydrophobic properties, thereby reducing the occurrence of water absorption and moisture problems in cellulose materials, ultimately yielding molybdenum disulfide nanosheets;

(2) adding 0.8-1.0 g of lithium fluoride to 20 mL of 30% hydrochloric acid solution, and then slowly adding titanium aluminum carbide under gentle stirring, and then stirring at 30-35° C. for 12-24 h, washing the resulting mixture with water until the pH is 6.0, and then subjecting it to ultrasonic treatment for 0.5-1 h, centrifuging at a speed of 2000-3000 rpm, and the centrifugal time of 20-30 min, vacuum drying the precipitate to obtain transition metal carbide; it possesses a multilayered structure and a large surface area, which enhances barrier properties and reduces moisture ingress; the nanosize and excellent mechanical properties of this two-dimensional material can also enhance the strength and toughness of the cellulose material; furthermore, the stable structure of the transition metal carbide can enhance the heat resistance of the cellulose material, enabling them to maintain stable performance at high temperature;

(3) dispersing the molybdenum disulfide nanosheets obtained in step (1) in 5-10 mL of water, stirring for 10-20 min, adding the transition metal carbide obtained in step (2) to it, subjecting it to ultrasonic treatment for 15-20 min, and then centrifuging and drying the precipitate, leaving thin and small molybdenum disulfide nanosheets adhered to the multiple layers of the transition metal carbide, forming a unique layered structure that effectively fills the gaps between the cellulose matrix; this structure exhibits excellent mechanical properties, hydrophobic properties, and heat resistance, which can reduce deformation and fracture problems in the cellulose material caused by moisture and heat exposure; additionally, the carrier role of the transition metal carbide mitigates the stacking and agglomeration of molybdenum disulfide nanosheets, resulting in a nanofiller of molybdenum disulfide nanosheet composite transition metal carbide.

Preferably, in step (2), the amount of titanium aluminum carbide added is 0.8-1.0 g, titanium aluminum carbide has a hexagonal layered structure; the aluminum atomic layer in titanium aluminum carbide can be etched by lithium fluoride and hydrochloric acid to prepare a new type of multi-layer two-dimensional material.

The invention also provides a preparation method of the cellulose-based environmentally friendly plastic substitute material, specifically comprising the following steps:

S1. mixing benzyltrimethylammonium chloride and oxalic acid dihydrate in a molar ratio of 1:1, stirring in an oil bath at 70-80° C. for 3-4 h, cooling at room temperature, and then heating the obtained deep eutectic solvent to 110-120° C., adding 9.0-10.0 g wheat straw, continuing stirring for 3-4 h; after the reaction is completed, using the deionized water to filter and wash the wheat straw treated with the low eutectic solvent, vacuum drying the filter residue and dispersing it in 50 mL of water, and mechanically treating with a high-pressure homogenizer, circulating the treatment 8-10 times at a pressure of 120-130 MPa; the surface of wheat straw residue exhibits more pores after pretreatment with the deep eutectic solvent, and the original smooth and intact structure is severely disrupted, hemicellulose and some lignin are removed, mechanical treatment is performed with a high-pressure homogenizer, the resulting wheat straw residue has finer particle size and enhanced thermal stability. This process also enables the preparation of lignin-containing nanocellulose from wheat straw as raw material, wherein the remaining lignin acts as a natural binder, enhancing the bonding between components and further improving the mechanical properties, making the material less prone to fracture, resulting in a lignin-containing nanocellulose suspension;

S2. dispersing the nanofiller of molybdenum disulfide nanosheet composite transition metal carbide in 50 mL of deionized water, stirring for 20-30 min, then adding citric acid, continuing to stirring for 20-30 min, and then mixing with the lignin-containing nanocellulose suspension obtained in S1, and magnetically stirring for 1-2 h; the nanofiller of molybdenum disulfide nanosheet composite transition metal carbide is uniformly and stably dispersed on the structure of the lignin-containing nanocellulose, effectively filling the void spaces within it and forming a dense network structure, which can serve as stress concentration points, capable of transmitting and dispersing external forces, enhancing mechanical properties, and reducing fracture occurrences; additionally, it can highly isolate the entry of moisture, lowering the risk of moisture absorption; the nanofiller of molybdenum disulfide nanosheet composite transition metal carbide contains elements C, O, N, and S, and these elements can enhance the crystal stability of the material, thereby significantly improving heat resistance and yielding a dense composite material;

S3. adding polyvinyl alcohol to 50 mL of deionized water, heating and stirring at 70-80° C. for 2-3 h, cooling at room temperature, mixing evenly with the dense composite material obtained in S2, stirring for 30 min, finally adding glycerol, stirring magnetically for 1 h, letting it stand to defoam, then cross-linking at 120-130° C. for 10-15 min, transferring to a plastic culture dish, drying to form a film at room temperature for 48 h, and drying and storing after removing the film; the addition of polyvinyl alcohol further enhances the heat resistance of the dense composite material and also increases its transparency, endowing it as a plastic substitute material with a certain aesthetic appeal; the material prepared through this process exhibits good toughness, hydrophobicity, and heat resistance, significantly extending its service life; as a result, a cellulose-based environmentally friendly plastic substitute material is obtained;

Preferably, in S2, the amount of citric acid added is 0.2-0.4 g; citric acid can form intermolecular covalent ester bonds with the hydroxyl groups of transition metal carbides and lignin-containing nanocellulose, thereby crosslinking and stabilizing the structure; this enhances the dispersion and bonding between the nanofiller of molybdenum disulfide nanosheet composite transition metal carbide and the matrix, preventing the detachment of the nanosheet filler;

Preferably, in S3, the amount of glycerol added is 0.3-0.5 g; glycerol, in an appropriate amount, can be as a plasticizer, making the material more tough and extending its service life.

The invention achieves the following advantageous effects:

by dispersing the nanofiller of molybdenum disulfide nanosheet composite transition metal carbide in the lignin-containing nanocellulose suspension, and under the crosslinking action of the citric acid, a dense composite material is formed; this material fully fills the voids in the lignin-containing nanocellulose structure, forming a stable and dense network structure that significantly enhances the toughness, hydrophobicity, and heat resistance of the composite material, thus reducing problems such as fracture and deformation caused by moisture or heat exposure. Then, the dense composite material is further synthesized with polyvinyl alcohol and glycerol to form the cellulose-based environmentally friendly plastic substitute material, which effectively improved the performance of the material and extended its service life. The molybdenum disulfide nanosheets adhere to the multiple layers of the transition metal carbide, forming a unique layered structure; the carrier role of the transition metal carbide mitigates the stacking and agglomeration of molybdenum disulfide nanosheets. The attachment of molybdenum disulfide nanosheets enhances the stability and complexity of the layered structure, effectively reducing the ingress of moisture and improving heat resistance; additionally, they function as plasticizers, capable of enhancing the strength and toughness of the cellulose material; this leads to excellent mechanical properties, hydrophobic properties, and heat resistance, thereby reducing problems such as cracking and deformation in the cellulose material caused by moisture absorption and heat exposure. In the dense composite material, the nanofiller of molybdenum disulfide nanosheet composite transition metal carbide is uniformly and stably dispersed on the structure of the lignin-containing nanocellulose under the action of citric acid, effectively filling the void spaces within it and forming a dense network structure, which can enhance toughness and reduce fracture; additionally, it can highly isolate the entry of moisture, lowering the risk of moisture absorption; the nanofiller of molybdenum disulfide nanosheet composite transition metal carbide contains elements C, O, N, and S, and these elements can enhance the crystal stability of the material, thereby significantly improving heat resistance. Among them, not only can citric acid enhance the compatibility and dispersion stability of the nanofiller and the matrix, but molybdenum disulfide nanosheets can also crosslink with the residual lignin in the matrix, further strengthening the binding force and dispersion compatibility; additionally, the crosslinking effect of citric acid can reduce the hydrophilicity of hydroxyl groups, which is beneficial for mitigating moisture absorption-induced dampness. The invention uses the nanofiller of molybdenum disulfide nanosheet composite transition metal carbide, the lignin-containing nanocellulose suspension, citric acid, glycerol and polyvinyl alcohol to prepare a cellulose-based environmentally friendly plastic substitute material; this material has excellent mechanical properties, hydrophobic properties and heat resistance, reducing breakage and deformation caused by moisture and heat, significantly extending the service life of the material.

4. BRIEF DESCRIPTION OF ACCOMPANY DRAWINGS

5. SPECIFIC EMBODIMENT OF THE INVENTION

Figure 1:
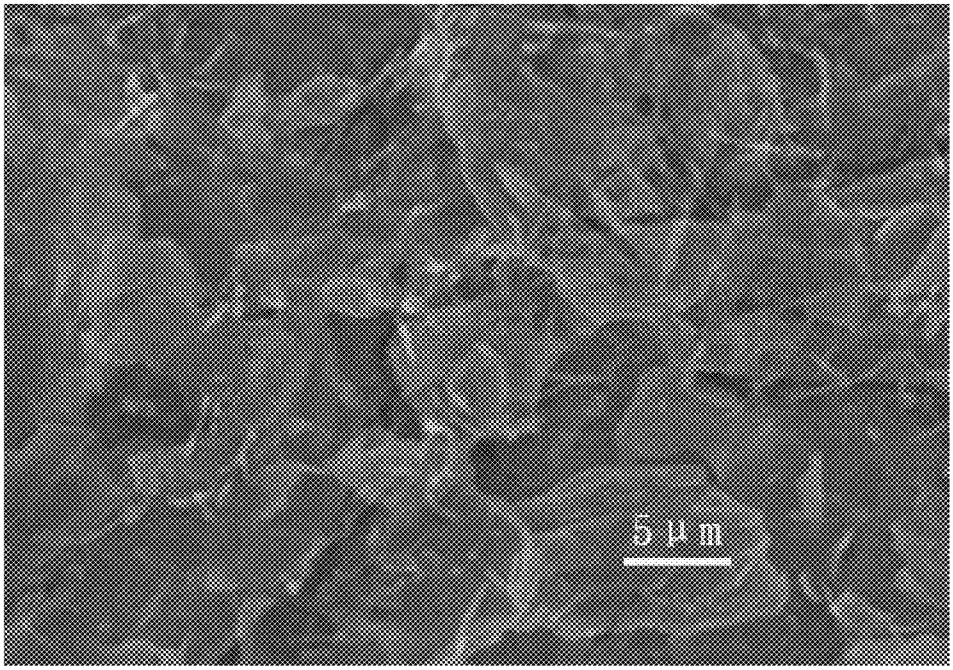
FIG. 1 shows a SEM image of the dense composite material prepared in Embodiment 1.

The technical schemes in the embodiments of the invention will be clearly and completely described in combination with the accompanying drawings in the embodiments of the invention. Obviously, the described embodiments are only some of the embodiments of the invention, but not all of the embodiments. Based on the embodiments in this invention, all other embodiments obtained by those of ordinary skill in the art without making creative efforts shall fall within the protection scope of this invention.

Unless otherwise defined, all professional and scientific terms used herein have the same meanings as those familiar to those skilled in the art. In addition, any methods and materials similar or equivalent to those described herein can be applied to the invention. The preferred embodiments and materials described herein are for demonstration purposes only and do not limit the content of the invention.

The experimental methods in the following embodiments are all conventional methods unless otherwise specified; the experimental instruments and materials used in the following embodiments are all purchased from commercial channels unless otherwise specified.

Embodiment 1

This embodiment provides a cellulose-based environmentally friendly plastic substitute material, comprising the following components in parts by weight: 30 parts of nanofiller of molybdenum disulfide nanosheet composite transition metal carbide, 50 parts of lignin-containing nanocellulose suspension, 4 parts of citric acid, 5 parts of glycerol, and 15 parts of polyvinyl alcohol.

The nanofiller of molybdenum disulfide nanosheet composite transition metal carbide comprises the following components in parts by weight: 40 parts of molybdenum disulfide nanosheets and 20 parts of transition metal carbide.

The lignin-containing nanocellulose suspension is prepared by pretreating wheat straw with a deep eutectic solvent of benzyltrimethylammonium chloride and oxalic acid dihydrate, and followed by high-pressure homogenization mechanical treatment.

A preparation method of the nanofiller of molybdenum disulfide nanosheet composite transition metal carbide specifically comprises the following steps:

(1) dispersing 40 mg of molybdenum disulfide and 100 μL of polyacrylic acid liquid in 25 mL of ultrapure water, ultrasonically treating for 6 h, and then centrifuging at 4000 rpm for 10 min, taking the supernatant and centrifuging it at a speed of 8000 rpm for 10 min, collecting the product, separating thinner molybdenum disulfide nanosheets from bulk molybdenum dioxide by using a chemical stripping method, which can serve as a plasticizer for filler modification, improving the brittle fracture of cellulose materials and endowing them with excellent mechanical properties; additionally, the sulfur atoms in the surface structure of molybdenum dioxide exhibit a certain degree of protrusion, which achieves hydrophobic properties, thereby reducing the occurrence of water absorption and moisture problems in cellulose materials, ultimately yielding molybdenum disulfide nanosheets;

(2) adding 1.0 g of lithium fluoride to 20 mL of 30% hydrochloric acid solution, and then slowly adding titanium aluminum carbide under gentle stirring; the amount of titanium aluminum carbide added is 1.0 g, titanium aluminum carbide has a hexagonal layered structure; the aluminum atomic layer in titanium aluminum carbide can be etched by lithium fluoride and hydrochloric acid to prepare a new type of multi-layer two-dimensional material; and then stirring at 35° C. for 24 h, washing the resulting mixture with water until the pH is 6.0, and then subjecting it to ultrasonic treatment for 1 h, centrifuging at a speed of 3000 rpm, and the centrifugal time of 30 min, vacuum drying the precipitate to obtain transition metal carbide; it possesses a multilayered structure and a large surface area, which enhances barrier properties and reduces moisture ingress; the nanosize and excellent mechanical properties of this two-dimensional material can also enhance the strength and toughness of the cellulose material; furthermore, the stable structure of the transition metal carbide can enhance the heat resistance of the cellulose material, enabling them to maintain stable performance at high temperature;

(3) dispersing the molybdenum disulfide nanosheets obtained in step (1) in 10 mL of water, stirring for 20 min, adding the transition metal carbide obtained in step (2) to it, subjecting it to ultrasonic treatment for 20 min, and then centrifuging and drying the precipitate, leaving thin and small molybdenum disulfide nanosheets adhered to the multiple layers of the transition metal carbide, forming a unique layered structure that effectively fills the gaps between the cellulose matrix; this structure exhibits excellent mechanical properties, hydrophobic properties, and heat resistance, which can reduce deformation and fracture problems in the cellulose material caused by moisture and heat exposure; additionally, the carrier role of the transition metal carbide mitigates the stacking and agglomeration of molybdenum disulfide nanosheets, resulting in a nanofiller of molybdenum disulfide nanosheet composite transition metal carbide.

The embodiment also provides a preparation method of the cellulose-based environmentally friendly plastic substitute material, specifically comprising the following steps:

S1. mixing benzyltrimethylammonium chloride and oxalic acid dihydrate in a molar ratio of 1:1, stirring in an oil bath at 80° C. for 4 h, cooling at room temperature, and then heating the obtained deep eutectic solvent to 120° C., adding 10.0 g wheat straw, continuing stirring for 4 h; after the reaction is completed, using the deionized water to filter and wash the wheat straw treated with the low eutectic solvent, vacuum drying the filter residue and dispersing it in 50 mL of water, and mechanically treating with a high-pressure homogenizer, circulating the treatment 10 times at a pressure of 130 MPa; the surface of wheat straw residue exhibits more pores after pre-treatment with the deep eutectic solvent, and the original smooth and intact structure is severely disrupted, hemicellulose and some lignin are removed, mechanical treatment is performed with a high-pressure homogenizer, the resulting wheat straw residue has finer particle size and enhanced thermal stability; this process also enables the preparation of lignin-containing nanocellulose from wheat straw as raw material, wherein the remaining lignin acts as a natural binder, enhancing the bonding between components and further improving the mechanical properties, making the material less prone to fracture, resulting in a lignin-containing nanocellulose suspension;

S2. dispersing the nanofiller of molybdenum disulfide nanosheet composite transition metal carbide in 50 mL of deionized water, stirring for 30 min, then adding citric acid, continuing to stirring for 30 min, with 0.4 g of citric acid added; citric acid can form intermolecular covalent ester bonds with the hydroxyl groups of transition metal carbides and lignin-containing nanocellulose, thereby crosslinking and stabilizing the structure; this enhances the dispersion and bonding between the nanofiller of molybdenum disulfide nanosheet composite transition metal carbide and the matrix, preventing the detachment of the nanosheet filler; and then mixing with the lignin-containing nanocellulose suspension obtained in S1, and magnetically stirring for 2 h; the nanofiller of molybdenum disulfide nanosheet composite transition metal carbide is uniformly and stably dispersed on the structure of the lignin-containing nanocellulose, effectively filling the void spaces within it and forming a dense network structure, which can serve as stress concentration points, capable of transmitting and dispersing external forces, enhancing mechanical properties, and reducing fracture occurrences; additionally, it can highly isolate the entry of moisture, lowering the risk of moisture absorption; the nanofiller of molybdenum disulfide nanosheet composite transition metal carbide contains elements C, O, N, and S, and these elements can enhance the crystal stability of the material, thereby significantly improving heat resistance and yielding a dense composite material;

S3. adding polyvinyl alcohol to 50 mL of deionized water, heating and stirring at 80° C. for 3 h, cooling at room temperature, mixing evenly with the dense composite material obtained in S2, stirring for 30 min, finally adding glycerol; the amount of glycerol added is 0.5 g; glycerol, in an appropriate amount, can be as a plasticizer, making the material more tough and extending its service life; then stirring magnetically for 1 h, letting it stand to defoam, then cross-linking at 130° C. for 15 min, transferring to a plastic culture dish, drying to form a film at room temperature for 48 h, and drying and storing after removing the film; the addition of polyvinyl alcohol further enhances the heat resistance of the dense composite material and also increases its transparency, endowing it as a plastic substitute material with a certain aesthetic appeal; the material prepared through this process exhibits good toughness, hydrophobicity, and heat resistance, significantly extending its service life; as a result, a cellulose-based environmentally friendly plastic substitute material is obtained.

In this embodiment, scanning electron microscopy (SEM) was employed to observe the micromorphology of the prepared dense composite material. FIG. 1 shows a SEM image magnified 2000 times of the dense composite material prepared in Embodiment 1. As shown in FIG. 1, the dense composite material prepared in this embodiment exhibits a dense structure containing lamellae, with no residual voids.

Embodiment 2

This embodiment provides a cellulose-based environmentally friendly plastic substitute material, comprising the following components in parts by weight: 20 parts of nanofiller of molybdenum disulfide nanosheet composite transition metal carbide, 40 parts of lignin-containing nanocellulose suspension, 2 parts of citric acid, 3 parts of glycerol, and 10 parts of polyvinyl alcohol.

The nanofiller of molybdenum disulfide nanosheet composite transition metal carbide comprises the following components in parts by weight: 30 parts of molybdenum disulfide nanosheets and 10 parts of transition metal carbide.

The lignin-containing nanocellulose suspension is prepared by pretreating wheat straw with a deep eutectic solvent of benzyltrimethylammonium chloride and oxalic acid dihydrate, and followed by high-pressure homogenization mechanical treatment.

A preparation method of the nanofiller of molybdenum disulfide nanosheet composite transition metal carbide specifically comprises the following steps:

(1) dispersing 30 mg of molybdenum disulfide and 100 μL of polyacrylic acid liquid in 25 mL of ultrapure water, ultrasonically treating for 5 h, and then centrifuging at 3000 rpm for 10 min, taking the supernatant and centrifuging it at a speed of 7000 rpm for 10 min, collecting the product, separating thinner molybdenum disulfide nanosheets from bulk molybdenum dioxide by using a chemical stripping method, which can serve as a plasticizer for filler modification, improving the brittle fracture of cellulose materials and endowing them with excellent mechanical properties; additionally, the sulfur atoms in the surface structure of molybdenum dioxide exhibit a certain degree of protrusion, which achieves hydrophobic properties, thereby reducing the occurrence of water absorption and moisture problems in cellulose materials, ultimately yielding molybdenum disulfide nanosheets;

(2) adding 0.8 g of lithium fluoride to 20 mL of 30% hydrochloric acid solution, and then slowly adding titanium aluminum carbide under gentle stirring; the amount of titanium aluminum carbide added is 0.8 g, titanium aluminum carbide has a hexagonal layered structure; the aluminum atomic layer in titanium aluminum carbide can be etched by lithium fluoride and hydrochloric acid to prepare a new type of multi-layer two-dimensional material; and then stirring at 30° C. for 12 h, washing the resulting mixture with water until the pH is 6.0, and then subjecting it to ultrasonic treatment for 0.5 h, centrifuging at a speed of 2000 rpm, and the centrifugal time of 20 min, vacuum drying the precipitate to obtain transition metal carbide; it possesses a multilayered structure and a large surface area, which enhances barrier properties and reduces moisture ingress; the nanosize and excellent mechanical properties of this two-dimensional material can also enhance the strength and toughness of the cellulose material; furthermore, the stable structure of the transition metal carbide can enhance the heat resistance of the cellulose material, enabling them to maintain stable performance at high temperature;

(3) dispersing the molybdenum disulfide nanosheets obtained in step (1) in 5 mL of water, stirring for 10 min, adding the transition metal carbide obtained in step (2) to it, subjecting it to ultrasonic treatment for 15 min, and then centrifuging and drying the precipitate, leaving thin and small molybdenum disulfide nanosheets adhered to the multiple layers of the transition metal carbide, forming a unique layered structure that effectively fills the gaps between the cellulose matrix; this structure exhibits excellent mechanical properties, hydrophobic properties, and heat resistance, which can reduce deformation and fracture problems in the cellulose material caused by moisture and heat exposure; additionally, the carrier role of the transition metal carbide mitigates the stacking and agglomeration of molybdenum disulfide nanosheets, resulting in a nanofiller of molybdenum disulfide nanosheet composite transition metal carbide.

The embodiment also provides a preparation method of the cellulose-based environmentally friendly plastic substitute material, specifically comprising the following steps:

S1. mixing benzyltrimethylammonium chloride and oxalic acid dihydrate in a molar ratio of 1:1, stirring in an oil bath at 70° C. for 3 h, cooling at room temperature, and then heating the obtained deep eutectic solvent to 110° C., adding 9.0 g wheat straw, continuing stirring for 3 h; after the reaction is completed, using the deionized water to filter and wash the wheat straw treated with the low eutectic solvent, vacuum drying the filter residue and dispersing it in 50 mL of water, and mechanically treating with a high-pressure homogenizer, circulating the treatment 8 times at a pressure of 120 MPa; the surface of wheat straw residue exhibits more pores after pre-treatment with the deep eutectic solvent, and the original smooth and intact structure is severely disrupted, hemicellulose and some lignin are removed, mechanical treatment is performed with a high-pressure homogenizer, the resulting wheat straw residue has finer particle size and enhanced thermal stability; this process also enables the preparation of lignin-containing nanocellulose from wheat straw as raw material, wherein the remaining lignin acts as a natural binder, enhancing the bonding between components and further improving the mechanical properties, making the material less prone to fracture, resulting in a lignin-containing nanocellulose suspension;

S2. dispersing the nanofiller of molybdenum disulfide nanosheet composite transition metal carbide in 50 mL of deionized water, stirring for 20 min, then adding citric acid, continuing to stirring for 20 min, with 0.2 g of citric acid added; citric acid can form intermolecular covalent ester bonds with the hydroxyl groups of transition metal carbides and lignin-containing nanocellulose, thereby crosslinking and stabilizing the structure; this enhances the dispersion and bonding between the nanofiller of molybdenum disulfide nanosheet composite transition metal carbide and the matrix, preventing the detachment of the nanosheet filler; and then mixing with the lignin-containing nanocellulose suspension obtained in S1, and magnetically stirring for 1 h; the nanofiller of molybdenum disulfide nanosheet composite transition metal carbide is uniformly and stably dispersed on the structure of the lignin-containing nanocellulose, effectively filling the void spaces within it and forming a dense network structure, which can serve as stress concentration points, capable of transmitting and dispersing external forces, enhancing mechanical properties, and reducing fracture occurrences; additionally, it can highly isolate the entry of moisture, lowering the risk of moisture absorption; the nanofiller of molybdenum disulfide nanosheet composite transition metal carbide contains elements C, O, N, and S, and these elements can enhance the crystal stability of the material, thereby significantly improving heat resistance and yielding a dense composite material;

S3. adding polyvinyl alcohol to 50 mL of deionized water, heating and stirring at 70° C. for 2 h, cooling at room temperature, mixing evenly with the dense composite material obtained in S2, stirring for 30 min, finally adding glycerol; the amount of glycerol added is 0.3 g; glycerol, in an appropriate amount, can be as a plasticizer, making the material more tough and extending its service life; then stirring magnetically for 1 h, letting it stand to defoam, then cross-linking at 120° C. for 10 min, transferring to a plastic culture dish, drying to form a film at room temperature for 48 h, and drying and storing after removing the film; the addition of polyvinyl alcohol further enhances the heat resistance of the dense composite material and also increases its transparency, endowing it as a plastic substitute material with a certain aesthetic appeal; the material prepared through this process exhibits good toughness, hydrophobicity, and heat resistance, significantly extending its service life; as a result, a cellulose-based environmentally friendly plastic substitute material is obtained.

Embodiment 3

This embodiment provides a cellulose-based environmentally friendly plastic substitute material, comprising the following components in parts by weight: 25 parts of nanofiller of molybdenum disulfide nanosheet composite transition metal carbide, 45 parts of lignin-containing nanocellulose suspension, 3 parts of citric acid, 4 parts of glycerol, and 12.5 parts of polyvinyl alcohol.

The nanofiller of molybdenum disulfide nanosheet composite transition metal carbide comprises the following components in parts by weight: 35 parts of molybdenum disulfide nanosheets and 15 parts of transition metal carbide.

The lignin-containing nanocellulose suspension is prepared by pretreating wheat straw with a deep eutectic solvent of benzyltrimethylammonium chloride and oxalic acid dihydrate, and followed by high-pressure homogenization mechanical treatment.

A preparation method of the nanofiller of molybdenum disulfide nanosheet composite transition metal carbide specifically comprises the following steps:

(1) dispersing 35 mg of molybdenum disulfide and 100 μL of polyacrylic acid liquid in 25 mL of ultrapure water, ultrasonically treating for 5.5 h, and then centrifuging at 3500 rpm for 10 min, taking the supernatant and centrifuging it at a speed of 7500 rpm for 10 min, collecting the product, separating thinner molybdenum disulfide nanosheets from bulk molybdenum dioxide by using a chemical stripping method, which can serve as a plasticizer for filler modification, improving the brittle fracture of cellulose materials and endowing them with excellent mechanical properties; additionally, the sulfur atoms in the surface structure of molybdenum dioxide exhibit a certain degree of protrusion, which achieves hydrophobic properties, thereby reducing the occurrence of water absorption and moisture problems in cellulose materials, ultimately yielding molybdenum disulfide nanosheets;

(2) adding 0.9 g of lithium fluoride to 20 mL of 30% hydrochloric acid solution, and then slowly adding titanium aluminum carbide under gentle stirring; the amount of titanium aluminum carbide added is 0.9 g, titanium aluminum carbide has a hexagonal layered structure; the aluminum atomic layer in titanium aluminum carbide can be etched by lithium fluoride and hydrochloric acid to prepare a new type of multi-layer two-dimensional material; and then stirring at 32.5° C. for 18 h, washing the resulting mixture with water until the pH is 6.0, and then subjecting it to ultrasonic treatment for 0.75 h, centrifuging at a speed of 2500 rpm, and the centrifugal time of 25 min, vacuum drying the precipitate to obtain transition metal carbide; it possesses a multilayered structure and a large surface area, which enhances barrier properties and reduces moisture ingress; the nanosize and excellent mechanical properties of this two-dimensional material can also enhance the strength and toughness of the cellulose material; furthermore, the stable structure of the transition metal carbide can enhance the heat resistance of the cellulose material, enabling them to maintain stable performance at high temperature;

(3) dispersing the molybdenum disulfide nanosheets obtained in step (1) in 7.5 mL of water, stirring for 15 min, adding the transition metal carbide obtained in step (2) to it, subjecting it to ultrasonic treatment for 17.5 min, and then centrifuging and drying the precipitate, leaving thin and small molybdenum disulfide nanosheets adhered to the multiple layers of the transition metal carbide, forming a unique layered structure that effectively fills the gaps between the cellulose matrix; this structure exhibits excellent mechanical properties, hydrophobic properties, and heat resistance, which can reduce deformation and fracture problems in the cellulose material caused by moisture and heat exposure; additionally, the carrier role of the transition metal carbide mitigates the stacking and agglomeration of molybdenum disulfide nanosheets, resulting in a nanofiller of molybdenum disulfide nanosheet composite transition metal carbide.

The embodiment also provides a preparation method of the cellulose-based environmentally friendly plastic substitute material, specifically comprising the following steps:

S1. mixing benzyltrimethylammonium chloride and oxalic acid dihydrate in a molar ratio of 1:1, stirring in an oil bath at 75° C. for 3.5 h, cooling at room temperature, and then heating the obtained deep eutectic solvent to 115° C., adding 9.5 g wheat straw, continuing stirring for 3.5 h; after the reaction is completed, using the deionized water to filter and wash the wheat straw treated with the low eutectic solvent, vacuum drying the filter residue and dispersing it in 50 mL of water, and mechanically treating with a high-pressure homogenizer, circulating the treatment 9 times at a pressure of 125 MPa; the surface of wheat straw residue exhibits more pores after pre-treatment with the deep eutectic solvent, and the original smooth and intact structure is severely disrupted, hemicellulose and some lignin are removed, mechanical treatment is performed with a high-pressure homogenizer, the resulting wheat straw residue has finer particle size and enhanced thermal stability; this process also enables the preparation of lignin-containing nanocellulose from wheat straw as raw material, wherein the remaining lignin acts as a natural binder, enhancing the bonding between components and further improving the mechanical properties, making the material less prone to fracture, resulting in a lignin-containing nanocellulose suspension;

S2. dispersing the nanofiller of molybdenum disulfide nanosheet composite transition metal carbide in 50 mL of deionized water, stirring for 25 min, then adding citric acid, continuing to stirring for 25 min, with 0.3 g of citric acid added; citric acid can form intermolecular covalent ester bonds with the hydroxyl groups of transition metal carbides and lignin-containing nanocellulose, thereby crosslinking and stabilizing the structure; this enhances the dispersion and bonding between the nanofiller of molybdenum disulfide nanosheet composite transition metal carbide and the matrix, preventing the detachment of the nanosheet filler; and then mixing with the lignin-containing nanocellulose suspension obtained in S1, and magnetically stirring for 1.5 h; the nanofiller of molybdenum disulfide nanosheet composite transition metal carbide is uniformly and stably dispersed on the structure of the lignin-containing nanocellulose, effectively filling the void spaces within it and forming a dense network structure, which can serve as stress concentration points, capable of transmitting and dispersing external forces, enhancing mechanical properties, and reducing fracture occurrences; additionally, it can highly isolate the entry of moisture, lowering the risk of moisture absorption; the nanofiller of molybdenum disulfide nanosheet composite transition metal carbide contains elements C, O, N, and S, and these elements can enhance the crystal stability of the material, thereby significantly improving heat resistance and yielding a dense composite material;

S3. adding polyvinyl alcohol to 50 mL of deionized water, heating and stirring at 75° C. for 2.5 h, cooling at room temperature, mixing evenly with the dense composite material obtained in S2, stirring for 30 min, finally adding glycerol; the amount of glycerol added is 0.4 g; glycerol, in an appropriate amount, can be as a plasticizer, making the material more tough and extending its service life; then stirring magnetically for 1 h, letting it stand to defoam, then cross-linking at 125° C. for 12.5 min, transferring to a plastic culture dish, drying to form a film at room temperature for 48 h, and drying and storing after removing the film; the addition of polyvinyl alcohol further enhances the heat resistance of the dense composite material and also increases its transparency, endowing it as a plastic substitute material with a certain aesthetic appeal; the material prepared through this process exhibits good toughness, hydrophobicity, and heat resistance, significantly extending its service life; as a result, a cellulose-based environmentally friendly plastic substitute material is obtained.

Embodiment 4

This embodiment provides a cellulose-based environmentally friendly plastic substitute material, comprising the following components in parts by weight: 20 parts of nanofiller of molybdenum disulfide nanosheet composite transition metal carbide, 50 parts of lignin-containing nanocellulose suspension, 2 parts of citric acid, 5 parts of glycerol, and 10 parts of polyvinyl alcohol.

The nanofiller of molybdenum disulfide nanosheet composite transition metal carbide comprises the following components in parts by weight: 40 parts of molybdenum disulfide nanosheets and 10 parts of transition metal carbide.

The lignin-containing nanocellulose suspension is prepared by pretreating wheat straw with a deep eutectic solvent of benzyltrimethylammonium chloride and oxalic acid dihydrate, and followed by high-pressure homogenization mechanical treatment.

A preparation method of the nanofiller of molybdenum disulfide nanosheet composite transition metal carbide specifically comprises the following steps:

(1) dispersing 40 mg of molybdenum disulfide and 100 μL of polyacrylic acid liquid in 25 mL of ultrapure water, ultrasonically treating for 5 h, and then centrifuging at 4000 rpm for 10 min, taking the supernatant and centrifuging it at a speed of 8000 rpm for 10 min, collecting the product, separating thinner molybdenum disulfide nanosheets from bulk molybdenum dioxide by using a chemical stripping method, which can serve as a plasticizer for filler modification, improving the brittle fracture of cellulose materials and endowing them with excellent mechanical properties; additionally, the sulfur atoms in the surface structure of molybdenum dioxide exhibit a certain degree of protrusion, which achieves hydrophobic properties, thereby reducing the occurrence of water absorption and moisture problems in cellulose materials, ultimately yielding molybdenum disulfide nanosheets;

(2) adding 1.0 g of lithium fluoride to 20 mL of 30% hydrochloric acid solution, and then slowly adding titanium aluminum carbide under gentle stirring; the amount of titanium aluminum carbide added is 1.0 g, titanium aluminum carbide has a hexagonal layered structure; the aluminum atomic layer in titanium aluminum carbide can be etched by lithium fluoride and hydrochloric acid to prepare a new type of multi-layer two-dimensional material; and then stirring at 35° C. for 12 h, washing the resulting mixture with water until the pH is 6.0, and then subjecting it to ultrasonic treatment for 0.5 h, centrifuging at a speed of 3000 rpm, and the centrifugal time of 20 min, vacuum drying the precipitate to obtain transition metal carbide; it possesses a multilayered structure and a large surface area, which enhances barrier properties and reduces moisture ingress; the nanosize and excellent mechanical properties of this two-dimensional material can also enhance the strength and toughness of the cellulose material; furthermore, the stable structure of the transition metal carbide can enhance the heat resistance of the cellulose material, enabling them to maintain stable performance at high temperature;

(3) dispersing the molybdenum disulfide nanosheets obtained in step (1) in 10 mL of water, stirring for 10 min, adding the transition metal carbide obtained in step (2) to it, subjecting it to ultrasonic treatment for 15 min, and then centrifuging and drying the precipitate, leaving thin and small molybdenum disulfide nanosheets adhered to the multiple layers of the transition metal carbide, forming a unique layered structure that effectively fills the gaps between the cellulose matrix; this structure exhibits excellent mechanical properties, hydrophobic properties, and heat resistance, which can reduce deformation and fracture problems in the cellulose material caused by moisture and heat exposure; additionally, the carrier role of the transition metal carbide mitigates the stacking and agglomeration of molybdenum disulfide nanosheets, resulting in a nanofiller of molybdenum disulfide nanosheet composite transition metal carbide.

The embodiment also provides a preparation method of the cellulose-based environmentally friendly plastic substitute material, specifically comprising the following steps:

S1. mixing benzyltrimethylammonium chloride and oxalic acid dihydrate in a molar ratio of 1:1, stirring in an oil bath at 80° C. for 3 h, cooling at room temperature, and then heating the obtained deep eutectic solvent to 120° C., adding 10.0 g wheat straw, continuing stirring for 3 h; after the reaction is completed, using the deionized water to filter and wash the wheat straw treated with the low eutectic solvent, vacuum drying the filter residue and dispersing it in 50 mL of water, and mechanically treating with a high-pressure homogenizer, circulating the treatment 10 times at a pressure of 130 MPa; the surface of wheat straw residue exhibits more pores after pre-treatment with the deep eutectic solvent, and the original smooth and intact structure is severely disrupted, hemicellulose and some lignin are removed, mechanical treatment is performed with a high-pressure homogenizer, the resulting wheat straw residue has finer particle size and enhanced thermal stability; this process also enables the preparation of lignin-containing nanocellulose from wheat straw as raw material, wherein the remaining lignin acts as a natural binder, enhancing the bonding between components and further improving the mechanical properties, making the material less prone to fracture, resulting in a lignin-containing nanocellulose suspension;

S2. dispersing the nanofiller of molybdenum disulfide nanosheet composite transition metal carbide in 50 mL of deionized water, stirring for 20 min, then adding citric acid, continuing to stirring for 20 min, with 0.2 g of citric acid added; citric acid can form intermolecular covalent ester bonds with the hydroxyl groups of transition metal carbides and lignin-containing nanocellulose, thereby crosslinking and stabilizing the structure; this enhances the dispersion and bonding between the nanofiller of molybdenum disulfide nanosheet composite transition metal carbide and the matrix, preventing the detachment of the nanosheet filler; and then mixing with the lignin-containing nanocellulose suspension obtained in S1, and magnetically stirring for 1 h; the nanofiller of molybdenum disulfide nanosheet composite transition metal carbide is uniformly and stably dispersed on the structure of the lignin-containing nanocellulose, effectively filling the void spaces within it and forming a dense network structure, which can serve as stress concentration points, capable of transmitting and dispersing external forces, enhancing mechanical properties, and reducing fracture occurrences; additionally, it can highly isolate the entry of moisture, lowering the risk of moisture absorption; the nanofiller of molybdenum disulfide nanosheet composite transition metal carbide contains elements C, O, N, and S, and these elements can enhance the crystal stability of the material, thereby significantly improving heat resistance and yielding a dense composite material;

S3. adding polyvinyl alcohol to 50 mL of deionized water, heating and stirring at 80° C. for 2 h, cooling at room temperature, mixing evenly with the dense composite material obtained in S2, stirring for 30 min, finally adding glycerol; the amount of glycerol added is 0.5 g; glycerol, in an appropriate amount, can be as a plasticizer, making the material more tough and extending its service life; then stirring magnetically for 1 h, letting it stand to defoam, then cross-linking at 130° C. for 10 min, transferring to a plastic culture dish, drying to form a film at room temperature for 48 h, and drying and storing after removing the film; the addition of polyvinyl alcohol further enhances the heat resistance of the dense composite material and also increases its transparency, endowing it as a plastic substitute material with a certain aesthetic appeal; the material prepared through this process exhibits good toughness, hydrophobicity, and heat resistance, significantly extending its service life; as a result, a cellulose-based environmentally friendly plastic substitute material is obtained.

Comparative Example 1

This comparative example provides a cellulose-based environmentally friendly plastic substitute material; the difference between this comparative example and Embodiment 1 is that the nanofiller of molybdenum disulfide nanosheet composite transition metal carbide does not contain molybdenum disulfide nanosheets; the preparation method of the nanofiller of molybdenum disulfide nanosheet composite transition metal carbide does not include step (1); the preparation method of the cellulose-based environmentally friendly plastic substitute material is the same as that of Embodiment 1.

Comparative Example 2

This comparative example provides a cellulose-based environmentally friendly plastic substitute material; the difference between this comparative example and Embodiment 1 is that the nanofiller of molybdenum disulfide nanosheet composite transition metal carbide does not contain transition metal carbide; the preparation method of the nanofiller of molybdenum disulfide nanosheet composite transition metal carbide does not include step (2); the preparation method of the cellulose-based environmentally friendly plastic substitute material is the same as that of Embodiment 1.

Comparative Example 3

This comparative example provides a cellulose-based environmentally friendly plastic substitute material; the difference between this comparative example and Embodiment 1 is that the preparation method of the cellulose-based environmentally friendly plastic substitute material does not contain citric acid, the preparation method of the nanofiller of molybdenum disulfide nanosheet composite transition metal carbide is the same as that of Embodiment 1, no citric acid is added in S2 of the preparation method of the cellulose-based environmentally friendly plastic substitute material.

Experimental Example 1

Mechanical Properties Experiment

Test samples: cellulose-based environmentally friendly plastic substitute materials prepared in Embodiments 1-4 and Comparative Examples 1-3.

Testing method: cut the test samples into standard dumbbell-shaped small specimens, and use a universal testing machine to test the tensile strength and elongation at break according to the national standard GB13022-91, set the tensile speed to 50 mm/min, test 5 samples in each group, and take the average value.

Figure 2:
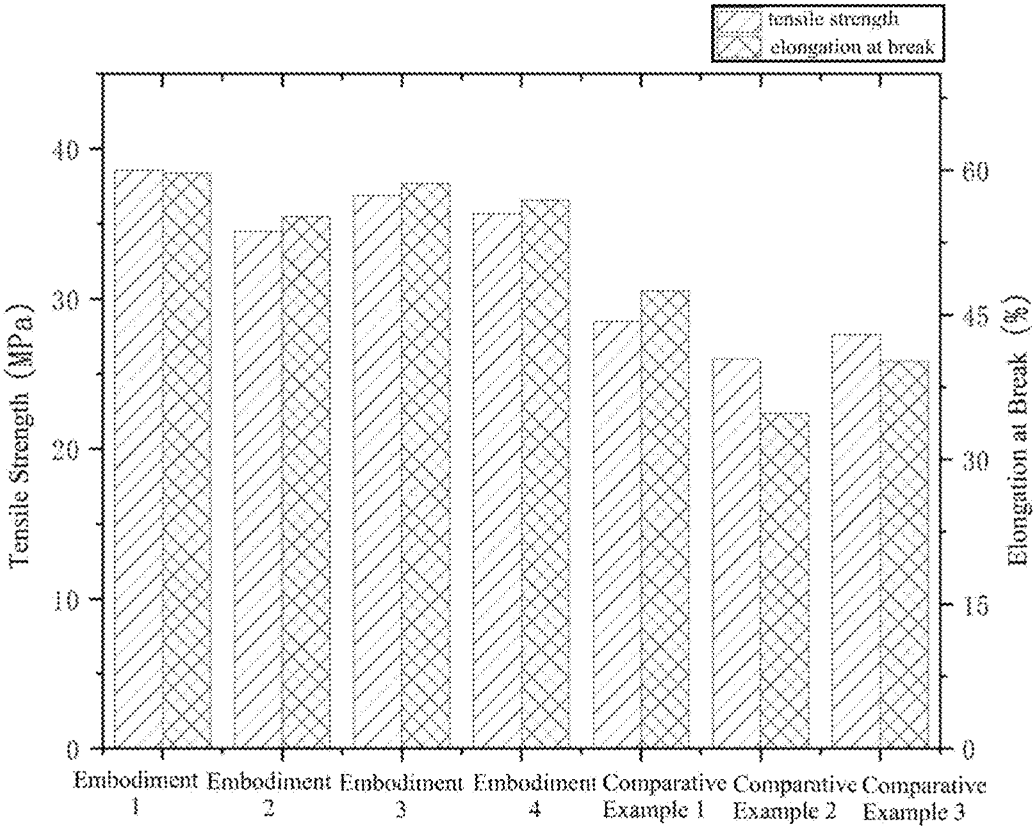
FIG. 2 shows the mechanical property results for Embodiments 1-4 and Comparative Examples 1-3.

FIG. 2 shows the mechanical property results for Embodiments 1-4 and Comparative Examples 1-3. As shown in the figure, the tensile strengths and elongations at break for Embodiments 1-4 are 34.5-38.6 MPa and 55.2-59.7%, respectively, indicating good mechanical properties; the tensile strengths and elongations at break for Comparative Examples 1-3 are 26.0-28.5 MPa and 34.8-47.5%, respectively, suggesting inferior mechanical properties. Specifically, the nanofiller of molybdenum disulfide nanosheet composite transition metal carbide in Comparative Example 1 does not contain molybdenum disulfide nanosheets, so the plasticizing effect of molybdenum disulfide nanosheets cannot be exerted, which is detrimental to improving the toughness of the material, resulting in poorer mechanical properties; the nanofiller of molybdenum disulfide nanosheet composite transition metal carbide in Comparative Example 2 does not contain transition metal carbide, this not only prevents the multi-layer two-dimensional material from improving the strength and toughness of the cellulose matrix, but also fails to reduce the aggregation of molybdenum disulfide nanosheets, thereby limiting their plasticizing effect, leading to inferior mechanical properties; the cellulose-based environmentally friendly plastic substitute material in Comparative Example 3 does not contain citric acid, this is detrimental to the compatibility and dispersion of the nanofiller of molybdenum disulfide nanosheet composite transition metal carbide in the lignin-containing nanocellulose suspension, preventing the formation of a dense network structure and impeding the enhancement of toughness, ultimately resulting in poorer mechanical properties.

Experimental Example 2

Hydrophobicity Test

Test Samples: cellulose-based environmentally friendly plastic substitute materials prepared in Embodiments 1-4 and Comparative Examples 1-3.

Testing Method: use a water vapor transmission rate tester (Model W3/060) to test, cut the test samples into circular shapes sized to fit the water vapor permeability cups, placed them into water vapor permeability cups containing a suitable amount of deionized water, seal the edges with rubber rings; after covering the water vapor permeability cups, place them in the testing chamber, measure the water vapor transmission rate of the samples, test 3 samples per group, take the average value for the result.

Figure 3:
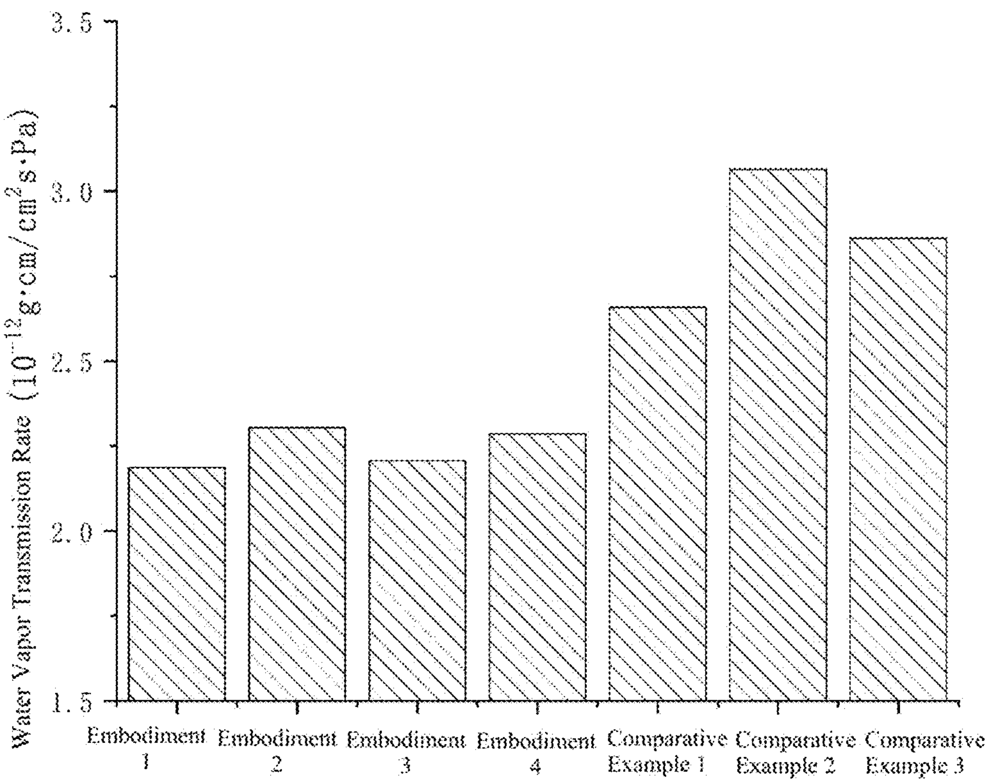
FIG. 3 shows the water vapor transmission rate results for Embodiments 1-4 and Comparative Examples 1-3.

FIG. 3 shows the water vapor transmission rate (WVTR) results for Embodiments 1-4 and Comparative Examples 1-3. As shown in the figure, the WVTR of Embodiments 1-4 is $2.186\times10^{-12}$-$2.305\times10^{-12}$ g·cm/cm$^2$s·Pa, indicating strong hydrophobicity and resistance to moisture absorption; the WVTR of Comparative Examples 1-3 is $2.659\times10^{-12}$-$3.064\times10^{-12}$ g·cm/cm$^2$s·Pa, suggesting weaker hydrophobicity and susceptibility to moisture absorption. Specifically, the nanofiller of molybdenum disulfide nanosheet composite transition metal carbide in Comparative Example 1 does not contain molybdenum disulfide nanosheets, this is conducive to increasing the complexity of the layered structure and cannot extend the entry path of water molecules, resulting in weaker hydrophobicity and ease of moisture absorption; the nanofiller of molybdenum disulfide nanosheet composite transition metal carbide in Comparative Example 2 does contain transition metal carbide, so it cannot rely on the multilayer structure and large surface area of the transition metal carbide to enhance barrier properties, which increases water permeation and ingress, leading to weaker hydrophobicity and susceptibility to moisture absorption; the cellulose-based environmentally friendly plastic substitute material in Comparative Example 3 does not contain citric acid, preventing the formation of a dense network structure, this is detrimental to highly effective moisture barrier properties and also prevents the reduction of the hydrophilicity of hydroxyl groups through crosslinking, resulting in weaker hydrophobicity and ease of moisture absorption.

Experimental Example 3

Heat Resistance Test

Test Samples: cellulose-based environmentally friendly plastic substitute materials prepared in Embodiments 1-4 and Comparative Examples 1-3.

Testing Method: cut the test samples into standard dumbbell-shaped specimens and conduct an accelerated test according to the thermal oxidative aging test standard GB/T7141-2008 (at 90° C. for 72 hours); after the test, measure the elongation at break; then, use the data from Experimental Example 1 as the pre-test performance parameters, calculate the decrease rate of elongation at break by using the following formula; a higher decrease rate of elongation at break indicates poorer heat resistance.

$$\text{Reduction Rate of Elongation at Break (\%)} = (\text{Elongation at Break Before Test} - \text{Elongation at Break After Test}) / \text{Elongation at Break Before Test} \times 100\%$$

Figure 4:
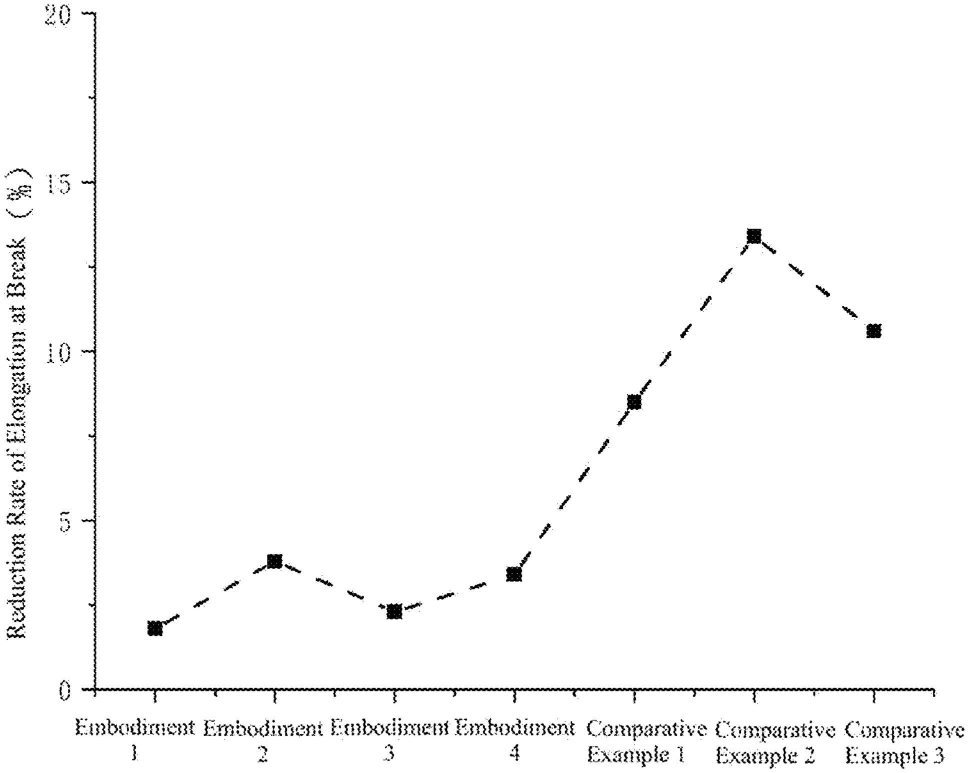
FIG. 4 shows the results of the reduction rate of elongation at break for Embodiments 1-4 and Comparative Examples 1-3.

FIG. 4 shows the results of the reduction rate of elongation at break for Embodiments 1-4 and Comparative Examples 1-3. As shown in the figure, the reduction rate of elongation at break for Embodiments 1-4 is 1.8-3.8%, indicating superior heat resistance and resistance to deformation at high temperatures; the reduction rate for Comparative Examples 1-3 is 8.5-13.4%, suggesting poor heat resistance and susceptibility to deformation at high temperatures. Specifically, the nanofiller of molybdenum disulfide nanosheet composite transition metal carbide in Comparative Example 1 does not contain molybdenum disulfide nanosheets, this is detrimental to enhancing the stability of the layered structure and lacks the stabilizing effect of the S element on the crystals, leading to poor heat resistance and susceptibility to deformation at high temperature; the nanofiller of molybdenum disulfide nanosheet composite transition metal carbide in Comparative Example 2 does not contain transition metal carbide, this lacks stable multilayer structure of transition metal carbide, and fails to reduce the aggregation of molybdenum disulfide nanosheets, leading to poor heat resistance and susceptibility to deformation at high temperature; the cellulose-based environmentally friendly plastic substitute material in Comparative Example 3 does not contain citric acid, this is detrimental to the compatibility and dispersion of the nanofiller of molybdenum disulfide nanosheet composite transition metal carbide and the matrix, preventing the formation of a dense network structure, further preventing filling the void spaces fully within the lignin-containing nanocellulose structure, resulting in poor heat resistance and easy deformation at high temperature.

The experimental results above indicate that the mechanical properties, hydrophobicity, and heat resistance of the Embodiments 1-4 of the invention are significantly superior to those of the Comparative Examples 1-3. Wherein the tensile strength and elongation at break, hydrophobicity, and heat resistance of Embodiment 1, which uses the nanofiller of molybdenum disulfide nanosheet composite transition metal carbide and the citric acid, are better. By dispersing the nanofiller of molybdenum disulfide nanosheet composite transition metal carbide in the lignin-containing nanocellulose suspension, and under the crosslinking action of the citric acid, a dense composite material is formed; this material fully fills the voids in the lignin-containing nanocellulose structure, forming a stable and dense network structure that significantly enhances the toughness, hydrophobicity, and heat resistance of the composite material, thus reducing problems such as fracture and deformation caused by moisture or heat exposure.

Although the embodiments of the invention have been shown and described above, it should be understood that those skilled in the art can make changes, modifications, substitutions and alterations to the above embodiments without departing from the principles and spirit of the invention.

The invention and its embodiments are described above, this description is not restrictive, and what is shown in the accompanying drawing is only one of the embodiments of the invention, and the actual structure is not limited to this. All in all, if those skilled in the art receives its enlightenment, without deviating from the object of the invention, and without creatively designing structures and embodiments similar to the technical scheme of the invention shall fall within the protection scope of the invention.

The invention claimed is:

1. A cellulose-based environmentally friendly plastic substitute material, comprising the following components in parts by weight: 20-30 parts of nanofiller of molybdenum disulfide nanosheet composite transition metal carbide, 40-50 parts of lignin-containing nanocellulose suspension, 2-4 parts of citric acid, 3-5 parts of glycerol, and 10-15 parts of polyvinyl alcohol; the nanofiller of molybdenum disulfide nanosheet composite transition metal carbide comprises the following components in parts by weight: 30-40 parts of molybdenum disulfide nanosheets and 10-20 parts of transition metal carbide; the lignin-containing nanocellulose suspension is prepared by pretreating wheat straw with a deep eutectic solvent of benzyltrimethylammonium chloride and oxalic acid dihydrate, and followed by high-pressure homogenization mechanical treatment.

2. A preparation method of the cellulose-based environmentally friendly plastic substitute material of claim 1, specifically comprising following steps:

(S1) mixing benzyltrimethylammonium chloride and oxalic acid dihydrate in a molar ratio of 1:1, stirring in an oil bath at 70-80° C. for 3-4 h, cooling at room temperature, and then heating the obtained deep eutectic solvent to 110-120° C., adding 9.0-10.0 g wheat straw, continuing stirring for 3-4 h; after the reaction is completed, using the deionized water to filter and wash the wheat straw treated with the low eutectic solvent, vacuum drying the filter residue and dispersing it in 50 mL of water, and mechanically treating with a high-pressure homogenizer, circulating the treatment 8-10 times at a pressure of 120-130 MPa to obtain a lignin-containing nanocellulose suspension;

(S2) dispersing the nanofiller of molybdenum disulfide nanosheet composite transition metal carbide in 50 mL of deionized water, stirring for 20-30 min, then adding citric acid, continuing to stirring for 20-30 min, and then mixing with the lignin-containing nanocellulose suspension obtained in (S1), and magnetically stirring for 1-2 h to obtain a dense composite material;

(S3) adding polyvinyl alcohol to 50 mL of deionized water, heating and stirring at 70-80° C. for 2-3 h, cooling at room temperature, mixing evenly with the dense composite material obtained in (S2), stirring for 30 min, finally adding glycerol, stirring magnetically for 1 h, letting it stand to defoam, then cross-linking at 120-130° C. for 10-15 min, transferring to a plastic culture dish, drying to form a film at room temperature for 48 h, and drying and storing after removing the film to obtain a cellulose-based environmentally friendly plastic substitute material.

3. The preparation method of the cellulose-based environmentally friendly plastic substitute material of claim 2, wherein in (S2), the amount of citric acid added is 0.2-0.4 g.

4. The preparation method of the cellulose-based environmentally friendly plastic substitute material of claim 3, wherein in (S3), the amount of glycerol added is 0.3-0.5 g.

5. The preparation method of the cellulose-based environmentally friendly plastic substitute material of claim 4, wherein a preparation method of the nanofiller of molybdenum disulfide nanosheet composite transition metal carbide specifically comprises the following steps:

(1) dispersing 30-40 mg of molybdenum disulfide and 100 μL of polyacrylic acid liquid in 25 mL of ultrapure water, ultrasonically treating for 5-6 h, and then centrifuging at 3000-4000 rpm for 10 min, taking the supernatant and centrifuging it at a speed of 7000-8000 rpm for 10 min, collecting the product to obtain molybdenum disulfide nanosheets;

(2) adding 0.8-1.0 g of lithium fluoride to 20 mL of 30% hydrochloric acid solution, and then slowly adding titanium aluminum carbide under gentle stirring, and then stirring at 30-35° C. for 12-24 h, washing the resulting mixture with water until the pH is 6.0, and then subjecting it to ultrasonic treatment for 0.5-1 h, centrifuging at a speed of 2000-3000 rpm, and the centrifugal time of 20-30 min, vacuum drying the precipitate to obtain transition metal carbide;

(3) dispersing the molybdenum disulfide nanosheets obtained in step (1) in 5-10 mL of water, stirring for 10-20 min, adding the transition metal carbide obtained in step (2) to it, subjecting it to ultrasonic treatment for 15-20 min, and then centrifuging and drying the precipitate to obtain a nanofiller of molybdenum disulfide nanosheet composite transition metal carbide.

6. The preparation method of the cellulose-based environmentally friendly plastic substitute material of claim 5, wherein in step (2), the amount of titanium aluminum carbide added is 0.8-1.0 g.

* * * * *